United States Patent
Kalogridis et al.

(10) Patent No.: US 10,194,373 B2
(45) Date of Patent: Jan. 29, 2019

(54) SELF-EVOLVING WIRELESS BACKHAUL

(71) Applicant: KABUSHIKI KAISHA TOSHIBA, Minato-ku (JP)

(72) Inventors: Georgios Kalogridis, Bristol (GB); Orestis Georgiou, Bristol (GB)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/546,551

(22) PCT Filed: Sep. 9, 2015

(86) PCT No.: PCT/GB2015/052608
§ 371 (c)(1),
(2) Date: Jul. 26, 2017

(87) PCT Pub. No.: WO2017/042523
PCT Pub. Date: Mar. 16, 2017

(65) Prior Publication Data
US 2018/0027473 A1    Jan. 25, 2018

(51) Int. Cl.
*H04W 40/22* (2009.01)
*H04L 12/14* (2006.01)
(Continued)

(52) U.S. Cl.
CPC ......... *H04W 40/22* (2013.01); *H04L 12/1457* (2013.01); *H04L 12/1478* (2013.01);
(Continued)

(58) Field of Classification Search
CPC ............... H04L 45/122; H04L 12/1457; H04L 12/1478; H04W 40/22; H04W 84/18;
(Continued)

(56) References Cited

U.S. PATENT DOCUMENTS

2011/0299673 A1* 12/2011 Mello ............... H04L 12/14
379/114.01
2012/0178462 A1   7/2012 Kim
(Continued)

FOREIGN PATENT DOCUMENTS

JP    2015-524195 A    8/2015
WO   WO 2008/021704 A2    2/2008

OTHER PUBLICATIONS

JengFarn Lee, et al., "An incentive-based fairness mechanism for multi-hop wireless backhaul networks with selfish nodes." IEEE Transactions on Wireless Communications, vol. 7, No. 2, 2008, pp. 697-704.

(Continued)

*Primary Examiner* — Mewale A Ambaye
(74) *Attorney, Agent, or Firm* — Oblon, McClelland, Maier & Neustadt, L.L.P.

(57) ABSTRACT

A wireless device including a processor and memory. The memory stores executable instructions and rules. The instructions, when executed by the processor, cause the device to store, if the wireless device forms part of a network including other wireless device and a backbone, information detailing topology of the network and/or status of other devices of the network, based on the rules. The topology information estimates costs and/or benefits of transmitting data to the backbone via other wireless devices of the network and based on the rules estimates the costs and/or benefits of transmitting data directly to the backbone. One or both estimates combine an estimation of technical costs of data transmission, compensation payments, and path length dependent network benefits. The device determines whether the costs and/or benefits of a direct exchange with the backbone outweigh those of data exchange with the backbone via other nodes.

13 Claims, 5 Drawing Sheets

(51) Int. Cl.
 *H04L 12/733* (2013.01)
 *H04W 84/18* (2009.01)
 *H04W 88/04* (2009.01)
(52) U.S. Cl.
 CPC ............ *H04L 45/122* (2013.01); *H04W 84/18* (2013.01); *H04W 88/04* (2013.01)
(58) Field of Classification Search
 CPC ......... H04W 88/04; H04W 4/16; H04W 4/24; H04W 76/10
 See application file for complete search history.

(56) References Cited

U.S. PATENT DOCUMENTS

2013/0316681 A1* 11/2013 Huang .................... H04W 4/24
 455/414.1
2014/0309927 A1* 10/2014 Ricci ........................ B60Q 1/00
 701/424

OTHER PUBLICATIONS

Mohamed Elsalih Mahmoud, et al., "Credit-based mechanism protecting multi-hop wireless networks from rational and irrational packet drop." Global Telecommunications Conference (GLOBECOM 2010), 2010 IEEE. IEEE, 2010, 5 pages.
Altman, Eitan, et al. "A survey on networking games in telecommunications." Computers & Operations Research 33.2, 2006, pp. 286-311.
Dimitris E. Charilas, et al., "A survey on game theory applications in wireless networks." Computer Networks 54.18, 2010, pp. 3421-3430.
Zhu Han, et al., "Coalition games with cooperative transmission: a cure for the curse of boundary nodes in selfish packet-forwarding wireless networks." Communications, IEEE Transactions on Communications, vol. 57, No. 1, 2009, pp. 203-213.
Jianwei Huang, et al., "Distributed interference compensation for wireless networks." Selected Areas in Communications, IEEE Journal on Selected Areas in Communications, vol. 24, No. 5, 2006, pp. 1074-1084.
Diego Perino, et al., "A reality check for content centric networking." Proceedings of the ACM SIGCOMM workshop on Information-centric networking. ACM, 2011, 6 pages.
Vincent Douglas Park, et al., "A highly the adaptive distributed routing algorithm for mobile wireless networks." INFOCOM'97. Sixteenth Annual Joint Conference of the IEEE Computer and Communications Societies. Driving the Information Revolution, Proceedings IEEE. vol. 3. IEEE, 1997, 9 pages.
Yuri Boykov, et al., "An experimental comparison of min-cut/max-flow algorithms for energy minimization in vision." IEEE Transactions on Pattern Analysis and Machine Intelligence, vol. 26, No. 9, 2004, pp. 1124-1137.
Sem Borst, et al., "Distributed caching algorithms for content distribution networks." INFOCOM, 2010 Proceedings IEEE. IEEE, 2010, 9 pages.
Naga Bhushan, et al., "Network Densification: The Dominant Theme for Wireless Evolution into 5G", IEEE Communications Magazine, 5 G Wireless Communication Systems: Prospects and Challenges, Feb. 2014, 8 pages.
Steven W. Peters, et al., "Relay Architectures for 3GPP LTE-Advanced", EURASIP Journal on Wireless Communications and Networking, vol. 2009, Article ID 618787, 2009, 14 pages.
WG802.11—Wireless LAN Working Group, 4 pages http://standards.ieee.org/develop/wg/WG802.11.html.
Ralf Pabst, et al. "Relay-based deployment concepts for wireless and mobile broadband radio", IEEE Communications Magazine, vol. 42, No. 9, Sep. 2004, 10 pages.
Sonja Buchegger, et al., "Performance analysis of the CONFIDANT protocol (cooperation of nodes: fairness in dynamic ad-hoc networks)," ACM MobiHoc, Jun. 2002, 11 pages.
Sergio Marti, et al., "Mitigating routing misbehavior in mobile ad hoc networks," ACM/IEEE Mobicom, Aug. 2000, 11 pages.
International Search Report dated May 24, 2016 in PCT/GB2015/052608.
Sheng Zhong, et al., "Sprite: A Simple, Cheat-Proof, Credit-Based System for Mobile Ad-Hoc Networks", IEEE Infocom 2003: the Conference on Computer Communications, vol. 3, XP008131823, Mar. 2003, pp. 1987-1997.

\* cited by examiner

SELF-EVOLVING WIRELESS BACKHAUL

FIELD

Embodiments described herein relate generally to a wireless device and method of operating same.

BACKGROUND

The technology area covered by the embodiments involves a hierarchical mobile communications system comprising a range of heterogeneous communication subsystems. These includes a communications backbone (referred to herein simply as "backbone"). The backbone is either wired, wireless or a combination of both. Such a backbone may include fiber-optics, Internet infrastructure, Base Transceiver Station (BTS), WiMAX, LTE, or any 3G-4G-5G related (mobile or wireless) communications technologies that connect to the core network. The subsystems further include a set of wireless backhauls (referred to herein simply as "backhaul"), such as clusters of well-connected wireless networks such as (multi-hop) mesh or sensor networks, IEEE 802.11, WiFi direct, IEEE 802.15.4, 6LoWPAN, NFC, M2M, device-to-device, LTE-direct, relay networks, or other 5G related (peer-to-peer or ad hoc wireless) communications technologies as well as an access point (AP). APs represent nodes that are part of the wireless backhaul system and which provide a connection with the communications backbone. The AP may be fixed and trusted (e.g. managed by a network operator), or mobile and untrusted (e.g. opportunistic and free-will). Wireless devices are referred to herein as nodes.

Many heterogeneous network approaches designed to blend backhaul and backbone technologies have in common the principle of cooperation in the sense of adhering to a specific protocol specification, which may, for example, be realised as a channel allocation and/or a data packet routing or offloading protocol as dictated by the regulator, the standard, or the ISP. Backhaul wireless networks (P2P, D2D, relay or mesh networks etc.) may be therefore be classified according to the protocol with which they cooperate as follows:

Coordinated backhaul cooperation: this concerns adherence to a set of rules that govern the manner with which wireless devices participate in wireless backhaul communications.

Self-evolving backhaul cooperation: this concerns the process of allowing each node to decide autonomously the level of its contribution, e.g. by means of a reciprocity-based, credit-based or reputation-based decision-making mechanism.

One of the problems faced by conventional routing schemes concerns the mechanism that provides a sufficient incentive for collaboration, and that protects against selfish (economically rational) or malicious nodes (free-riders) or unfavourable communication conditions such as the curse of the boundary nodes. From a technical point of view, it is not in a node's interest to forward arriving packets. However, refusal to cooperate will severely degrade the network and even impair the node's own performance. A number of prior-art approaches used to encourage packet-forwarding can be categorised into two general types, Credit-based methods and Reputation-based systems that include community enforcement schemes that, by means of detecting and punishing misbehaving nodes seek to encourage cooperation of the nodes.

Reputation based systems suffer several problems. They do not provide a direct incentive for collaboration. This is unfavourable in highly dynamic conditions in which mobile nodes might change location or even change their identification credentials. They depend on the ability of nodes to monitor peer nodes forwarding packets, and analysing these packets in order to detect an attack.

In typical credit-based approaches, a node receives some credit for forwarding a packet, and such credits are deducted from the original sender (or destination). While in many works the credit mechanism requires tamper-proof hardware, it is also possible to rely on a record of electronic receipts, which a node can use to claim credit from a Credit Clearance Service. Credit is, however, typically paid by the originating sender and not the destination node, to help prevent against flooding attacks, in which rogue senders send packets to the destination repeatedly. However, in the download scenario, in which a node does not spend energy to transmit, the node has no incentive to request data from (and pay) the ad hoc network, if it is possible to request this data directly from the source. Thus, the known credit-based approaches cannot be adapted to the backbone and backhaul system architecture.

In credit-based systems credit may need to be paid to every node that forwards a packet, regardless of whether or not the packet reaches its destination. This gives rise to denial-of-service and collusion attacks. For example, if an intermediate node does not forward the packet, then the sender will still need to pay the previous packet-forwarding nodes. However, this allows a collusion attack in which intermediate nodes fabricate packet-forwarding receipts in order to claim credit for data packets which they have not really forwarded. If, otherwise, credit is only paid when a packet reaches its destination, then nodes will have a reduced incentive to forward a packet in fear that a subsequent node may not forward the packet.

Moreover, in credit-based systems in which a fixed amount of credit needs to be paid to every node that forwards packets malicious intermediate nodes may extend the packet forwarding route, including forwarding packets with a delay, so that more of them receive credit for the sender.

BRIEF DESCRIPTION OF THE DRAWINGS

In the following, embodiments will be described with reference to the drawings in which.

DETAILED DESCRIPTION

According to an embodiment there is provided a wireless device comprising a processor and memory storing. The memory stores executable instructions and rules defining benefits to be received by wireless devices and costs incurred by the wireless devices when the wireless devices participate in data transfer in a network. The instructions, when executed by the processor, cause the device to store, if the wireless device forms part of a network comprising other wireless device and a backbone, information detailing the topology of the network and/or the status of other devices of this network, based on the rules and the topology information estimate the costs and/or benefits of transmitting data to the backbone via other wireless devices of the network and based on the rules estimate the costs and/or benefits of transmitting data directly to the backbone. One or both estimates combine an estimation of the technical costs of data transmission, their compensation payments and path length dependent network benefits. The instructions, when executed by the processor, further cause the device to determine whether the costs and/or benefits of a direct exchange with the backbone outweigh those of data exchange with the backbone via other nodes.

The device may only participate in data transfer if the balance between costs and benefit of the chosen route is positive.

In an embodiment the wireless device estimates, based on the rules, if a next wireless device on a route to the backhaul is more likely, based on a cost/benefit analysis, to exchange data with further wireless devices in the data exchange with the backhaul or to exchange data directly with the backhaul and, based on the cost/benefit determination for the next wireless device, revise the estimate of the cost and/or benefits of transmitting data to the backbone via the other wireless devices.

In an embodiment the wireless device further repeats the estimation for a next wireless device until it is determined that the next wireless device is likely to exchange data directly with the backbone.

In an embodiment the wireless device further comprises a cache storage, the instructions causing the processor, when executed to check whether or not predetermined data is stored in the cache upon receipt of a request from another wireless device for transmission of the predetermined data, perform a cost/benefit analysis of transmitting the predetermined data to the other wireless device and, if the cost/benefit analysis indicates that transmission of the predetermined data is advantageous for the wireless device, read the predetermined data from the cache and transmit the read data to the other wireless device. Transmission of the predetermined data is, for example, advantageous for the wireless device if the benefits and/or recompense derived or received by the wireless device outweigh the technical costs incurred by the device, for example in the form of battery drain.

In an embodiment the instructions when executed further cause the device to perform said estimates following receipt of a request from another wireless device to transmit data to or from the backbone.

In an embodiment the instructions when executed further causing the device to use a route discovery protocol to form an initial estimate of the number of wireless devices likely to be involved in data transmission to/from the backhaul and form an initial estimate of the costs and/or benefits of transmitting data via other wireless devices in the network using a route discovered using the discovery protocol.

In an embodiment the topology information comprises and index table that includes details of the location of other wireless devices in the network and/or information of the data transmission services other wireless devices in the network are likely to participate in.

In an embodiment an instance of the RPL protocol is used to update the index table and/or to discover a parent wireless device and/or updating the index table by using data received directly from the backbone. The update protocol may be part of RPL, which in turn, is part of 6TiSCH.

In an embodiment the instructions, when executed, further cause the device to participate in data exchange via other wireless devices, directly with the backbone or by supplying data stored in cache, depending on the, in view of the performed cost/benefit analysis, most favourable manner of participating or to refuse participation if the costs of doing so outweigh the benefits.

In an embodiment the instructions when executed, further causing the device to receive compensation for data communication services rendered to other wireless devices and, if the device has initiated a data exchange, pay other wireless devices for data exchange services rendered.

In an embodiment the rules define the benefits and costs such that a net benefit accrued by a wireless device participating in data transmission is the same irrespective if the wireless device participates in the forwarding of data received from another wireless device to a named destination in an upload or in a download scenario, or a combination of both.

In an embodiment a service cost is estimated and credited or debited to wireless devices that participate in a wireless multihop backhaul. This cost provides an incentive for increasing the efficiency of the network by means of relaying data through the backhaul.

In an embodiment the technical cost of an indirect multihop backhaul route are estimated, as compared with the technical cost of a direct access communication link, and used a potential saving (difference) in order to calculate a service cost, which service cost is shared among the wireless devices participating in the wireless multihop backhaul in the form of a service benefit.

In an embodiment a wireless backhaul network comprises a number of aforementioned wireless devices, a backbone and a credit server allocating earned or spent credits to the wireless devices. The wireless devices and the backbone are in or can establish wireless communication channels between them to form a network.

In an embodiment communication links between the wireless devices and/or wireless device(s) and the backbone are delay tolerant.

In an embodiment the devices are capable of instantiating an ad hoc wireless network by using Wi-Fi mesh, 6LoWPAN, or LTE direct.

In an embodiment the network is a Wireless mesh/sensor network, a Wi-Fi direct network, a LTE direct network, a delay-tolerant networks, an Internet of Things network, a machine to machine network or a 5G communications network.

According to an embodiment there is provide a method of operating a wireless device comprising a processor and memory storing executable instructions and rules defining benefits to be received by wireless devices and costs incurred by the wireless devices when the wireless devices participate in data transfer in a network. The method comprises storing, if the wireless device forms part of a network comprising other wireless device and a backbone, information detailing the topology of the network, based on the rules and the topology information estimating the costs and/or benefits of transmitting data to the backbone via other wireless devices of the network and based on the rules estimating the costs and/or benefits of transmitting data directly to the backbone. One or both estimates combine an estimation of the technical costs of data transmission, their compensation payments and path length dependent network benefits. The method further comprises determining whether the costs and/or benefits of a direct exchange with the backbone outweigh those of data exchange with the backbone via other nodes.

According to an embodiment there is provide a method of operating a wireless network comprising a plurality of wireless devices and a backbone. The method comprises one of the wireless devices initiating data upload to the backbone or a data download from the backbone, the initiating wireless device estimating, based on rules defining benefits to be received by wireless devices and costs incurred by the wireless devices within the network when the wireless devices participate in data transfer in a network and on information of the topology of the network formed by the wireless devices, the costs of uploading or downloading the data via other wireless devices in the network, the initiating wireless device estimating the costs of uploading or downloading the data directly to/from the backbone, determining whether the costs and/or benefits of a direct data exchange with the backbone outweigh those of data exchange with the backbone via other nodes and the initiating wireless device initiating the upload or requesting the download directly from the backbone or via the other wireless devices based on the determination. One or both estimates combine an estimation of the technical costs of data transmission, their compensation payments and path length dependent network benefits.

Preferred embodiments enable indirect multi-hop backhaul technologies and direct backbone technologies to co-exist in a self-evolving, decentralised, and robust manner. Fairness, system functionality, efficiency, scalability are hereby maintained and defection and collusion attacks are discouraged. Waste and costly overheads are avoided. The backhaul system introduced in by the embodiments is a credit-based self-evolving routing scheme for devices capable of both direct and indirect communication routes to backbone applications and services, including a credit server. The payment to wireless devices to compensate them for the technical costs associated with participation in data transfer, hereinafter referred to as technical compensation cost is such that the incentives in the case of upload and download are the same. The method of the embodiments includes a trade-off between technical costs and credit based benefits that supports/enables a choice between direct and indirect communications. The method also pre-estimates of peer wireless devices' technical and credit trade-off, to estimate the length of an indirect route. As determinations are made by individual wireless devices the wireless devices and the method operated thereon are decentralised.

Telecommunication networks today are becoming larger, more complex and dynamic systems in order to support new services that demand increasingly higher data rates. This patent is based on the premise of heterogeneous networks comprising a hybrid infrastructure-based and decentralised ad hoc wireless mobile communications technologies that are able to autonomously re-configure, self-optimise and scale into complex networks.

A problem suffered by conventional technology concerns the mechanism with which mobile devices are given incentives to be part of a well-connected multi-hop wireless backhaul.

Figure 1:
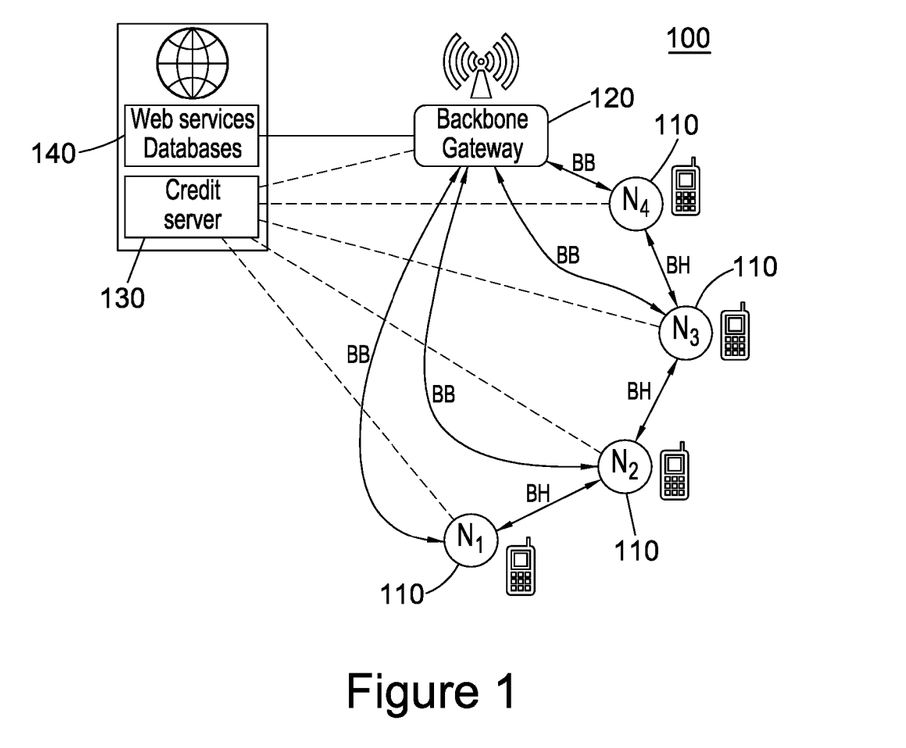
FIG. 1 shows and example network architecture of Backbone and multi-hop Backhaul systems where nodes N1 to N3 have the option of both Backbone (BB) and Backhaul (BH) routes.

FIG. 1 illustrates a Heterogeneous communications system 100 in which an embodiment can be implemented. FIG. 1 shows a number of wireless sensors/devices/nodes 110 and a backbone gateway 120. The nodes 110 may be located anywhere in the system 100. However, given that the costs of direct data exchange between a node 110 and the backbone gateway 120 is the highest for nodes 110 located at the edge of the system 100 it is clear that such "edge" nodes benefit most from the present embodiments, as will become readily apparent in the following.

The backbone is part of the network connecting to be a core, centralised communication network providing access to application services. To connect to a particular service, for example provided on a web services database 140, each node can either connect to the gateway 120 directly (as indicated by the arrows labelled 'backbone' in FIG. 1) or indirectly via the backhaul (as indicated by the arrows labelled 'backhaul' in FIG. 1). The backhaul network is a wireless access network comprising intermediate links between the backbone/core network and other nodes in the network, such as nodes in the network edge. The services/database 140 may be located in the cloud.

Nodes 110 at the edge of network 100 in particular may access the gateway 120 in a multi-hop fashion via the backhaul, as is the case for nodes $N_1$ to $N_3$. Multiple potentially overlapping multi-hop backhauls may exist simultaneously. Within a multi-hop backhaul each node is able to relay traffic to/from the backbone or forward to other relays in the backhaul, or even store data in a local cache to support a web/application service.

A node 110 of an embodiment has the option to access data or application services via two avenues:
1) directly from the backbone (subject to a communication link being available) and
2) indirectly through a reconfigurable multi-hop wireless backhaul route. The choice between the two avenues is performed locally and at each hop along the backhaul route.

Two further choices include:
a) the node 110 caching data for future re-use, and
b) the node 110 ignoring a request to upload or download, for example if participating in facilitating the request is likely to incur a negative payoff.

Figure 2:
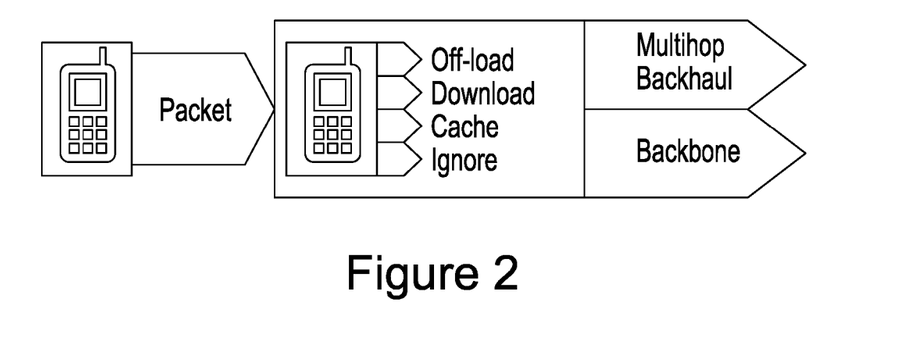
FIG. 2 shows a free-will set of choices available to a wireless node in an embodiment.

These options are illustrated in FIG. 2.

To enable a node 110 to make the relevant choice, a node 110 according to an embodiment stores and/or regularly updates current information about the multi-hop backhaul network architecture. This allows for the calculation of, for instance, a shortest multi-hop route (or similar) towards a backbone gateway, or more generally, the number of hops that a particular route may involve.

In an embodiment a credit based system is used to promote cooperation between wireless backhaul devices and sensors.

Using the stored up-to-date data regarding the network topology the nodes according to the embodiment calculate:
a) the technical/service cost (e.g. in terms of transmit power requirements) of uploading/downloading data directly from the backbone,
b) a multi-hop wireless backhaul route to/from the backbone and the technical/service cost of uploading data/forwarding a requesting to the next backhaul relay along the route,
c) an estimate of the credit it expects to receive, for example in the form of a service benefit, in return for cooperating in wireless backhaul communications.

The service benefit is, in one embodiment, shared equally by all wireless backhaul participants along the multi-hop route implemented, and is provided by the backbone after the node that initiates a data request confirms that the request has been served. Using the above calculated quantities, a device or sensor node formulates cost/benefit inequalities and make a decision. In addition, and in order to guarantee a balance of the credit system, the request-initiating device/sensor agrees to pay a service cost when it uploads or downloads data to/from a peer backhaul node, which service cost is used to pay backhaul nodes the service benefit.

Upload multi-hop backhaul transmissions are less costly for the wireless device/sensor, for example in terms of energy consumption. Additionally a cooperation credit is acquired. This credit is also referred to herein as the service benefit and can be used to initiate data or application requests in the form of the service cost (and thus make further savings in future services).

In the case of download, the system assumes that any node will need to compensate a second node the cost of sending data to the first node, if the first node requests the second node to do so. In the embodiment this cost is not payable when the second node sends data to the first node, without the first node asking for it.

From the backbone's point of view, transmissions cost less (e.g. in terms of energy consumption) when the backhaul is used for download.

From a network point of view, data routes are more energy efficient, and self-organising both in upload and download backhaul cases. This could benefit, for example, smart personal APs.

A node 110 according to an embodiment maintains (in memory) an Index Table (e.g. by processing WiFi beacon signals, or by Rank information communicated by an instance of the RPL protocol), which comprises a set of Node Indexes (NI). Each NI contains information about a peer neighbouring node and, optionally, a set of indexes to data/application services that this node offers. In an embodiment the structure of the Index Table and NI maintains in memory the following information for nodes within the network.

Physical indexes: This includes a set of indexes that characterise one or more of:
  a. the recent (or historical) location of the indexed neighbouring node,
  b. the recent (or historical) network activity of the indexed neighbouring node,
  c. the neighbouring node's communication capability and
  d. the identity of one backhaul node.

The physical indexes can include a time sequence of related parameters that have been provided (e.g. broadcasted) by the backhaul node at different timestamps (t1, t2, and etc.) These parameters include identity, geo-positioning, access network, battery status and other device status information.

Service indexes: This includes a set of indexes to services the neighbouring node 110 is prepared to offer. Each one of this service indexes is, in an embodiment, further structured as follows:
  e. Download (pull) index: This is a filter that specifies data/information that the node 110 is willing to accept to download (and communicate back) in order to serve an incoming download request. For example this index may be a World Wide Web address (e.g. backboneC), the contents of which the node is offering to download.
  f. Upload (push) index: This is a filter that specifies database/application services towards which the node 110 is willing to upload data in order to serve an incoming upload request. For example such an index may be a database server (e.g. application of e-health) that collects data from wireless sensors.
  g. Cache index: This is an index to data/information a copy of which the node 110 stores in local memory and is willing to communicate back at request in order to serve an incoming download request. For example this index may be a World Wide Web address (e.g. backboneC), the contents of which are cashed within the node.
  h. Time delay and Quality of Service index: This is an index to represent an amount of delay, the Quality of Service (QoS), or a time-based communication scheduler that may be linked with a specific download, upload, or cache index. For example, a delay index may signify a maximum amount of time to wait before incoming sensor data is pushed into a database (or further to another node), or pulled from a website (or another node). As a second example, a delay index may signify the times of the day the node is scheduled to push sensor data to a database, or pull and cache data from a website. A third example includes other timing conditions under which the node may push/pull data, e.g. when the battery level is sufficient or when the node is connected to particular access points.

The Index Table that each node 110 maintains may be updated in two ways. It may firstly be updated in a centralised manner, wherein each node 110 updating its Index Table directly from the Backbone. A second alternative may involve a route discovery protocol that enables each node to update and communicate its NI within a multi-hop backhaul. Route discovery protocols that might be used in this setting are well known in the art and it is consequently not necessary for such protocols to be described in detail as part of the present discussion. For example, aspects of the IETF 6TiSCH protocol specification, and in particular an instance of the RPL protocol are suitable for a decentralised updating of the NI.

Figure 3:
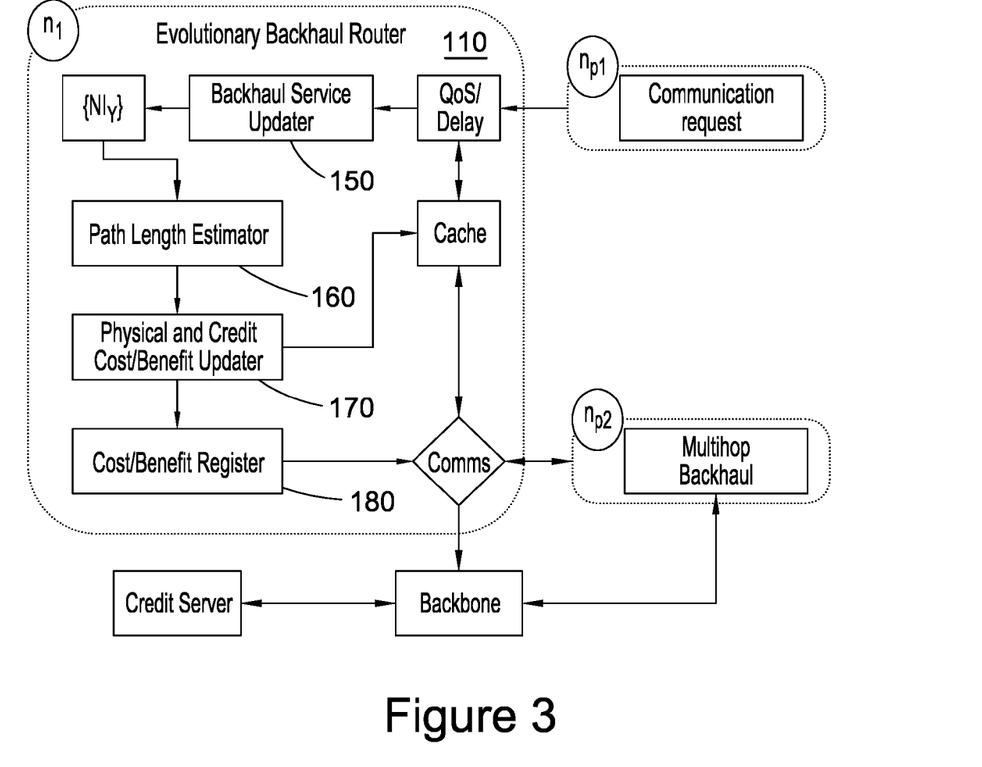
FIG. 3 shows the architecture of a router according to an embodiment.

The functional architecture of a node 110, denoted $n_1$, is shown in FIG. 3. The node 110 comprises a Backhaul Service Updater 150, a Path Length Estimator 160, a Physical and Credit Cost/Benefit Updater 170 and a Cost/Benefit Register 180. The Backhaul Service Updater is configured to update the node's 110 Index Table of peer neighbouring nodes, e.g. at regular intervals or at request. The multi-hop backhaul may be represented within the node 110 by a network topology within which other nodes 110 are likely to be within a k-hop communication range, where k is either a predetermined number of is determined locally by node $100/n_1$ based on maximum allowable delay requirements.

The Backhaul Service Updater 150 is further configured to evaluate a set of nodes 110 that are eligible to contribute towards serving a local or incoming communication request. Data to be uploaded/downloaded via a node 110 may be accompanied by a set of restrictions and/or requirements set by an initiating node 110. These may, for example, include reliability and delay requirements. Eligibility is determined by comparing the upload or download application requirements with the Service Indexes of the NI of the neighbouring nodes 110. That is, the initiating node 110 checks the Service Indexes from all neighbouring nodes in order to determine which of them are eligible, i.e. meet the download, upload, cache and delay service requirements set by the checking node 110. The Backhaul Service Updater 150 provides a set of eligible, service-specific nodes $\{NI_Y\}$.

The Path Length Estimator 160 is configured to estimate the likely number of hops required to reach the backbone, in case of a multi-hop backhaul route being chosen. This estimation uses the information provided by the Backhaul Service Updater 150 on the information relating to the set {$NI_Y$} of nodes. The Path Length Estimator 160 is configured to operate in accordance with an embodiment, as described in further detail below, to predict when it is likely that a peer node 110 will not use another hop and will instead serve the request directly from the backbone or the local cache.

The Physical and Credit Cost/Benefit Updater 170 enables the estimation of the payoff (i.e. the benefit minus the cost) incurred by handling a communication requests in different ways, ranging from ignoring a request (zero cost/benefit), serving a request from the local cache, forwarding the request to another node 110 or pushing/pulling data directly to/from the backbone. The operational details of this process are described in more detail further below.

The Cost/Benefit Register 180 maintains records of technical and service benefits and costs. The register 180 is configure to update estimate values, and to verify at a later stage whether or not these evaluations match the real service benefits obtained and service costs spent. The register 180 is also configured to securely communicate with the Credit Server 130 shown in FIG. 1 in order to claim and pay service benefits and costs in a secure and malicious-proof way. The details of this process are not part of this invention.

Costs and Benefits of a Credit System According to an Embodiment

In an embodiment a number of costs are defined to provide equal incentives to nodes 110 to use the backhaul, irrespective of whether participation in uploading or downloading is requested of them.

The Technical Cost $C_T^{n_x,n_y}$ represents the physical communications and computation cost (e.g. the energy spent) of communicating data from a node $n_x$ to another node $n_y$. These costs include, in an embodiment, the cost of wireless power transmission, of signal encoding and of signal decoding as well as the processing and relaying download, upload, or cache requests. This cost is a function of the wireless channel model (e.g. the distance between $n_x$ and $n_y$). The cost is also a function of the amount of data to be communicated as well as the time of communication (e.g. the service delay indexes). For simplicity, other technical cost factors mentioned above are not considered in this disclosure. Technical costs are distinguished as relating to Backbone Technical Costs and Backhaul Technical Cost. The Backbone Technical Cost $C_{BB,T}^{n_x,n_{BB}}$ is the technical cost of node $n_x$ communicating with the backbone or backbone gateway node. The Backhaul Technical Cost $C_{BH,T}^{n_x,n_y}$ is the technical cost of node 110/$n_1$ communicating with the (next or previous) backhaul node $n_2$.

Technical benefits are physical communications benefit, such as energy harvested, or an informatics/computation benefit (e.g. knowledge acquisition), or a value of caching data, that is feasible when contributing to communication between the nodes 110.

Service costs are virtual costs (or credit) a node 110 may need to pay or credit to another node. Two types of service cost, Backhaul Service Costs and Technical Compensation Service Costs, are referred to herein. Backhaul Service Cost $C_{BH,S}^{n_0,n_{BB}}$ are costs that the initiating node 110/$n_0$ is debited for making a download, upload, or cache service request through the backhaul. Service costs may be determined by the initiating node. They can be a function of the initial distance between this node and the backbone (destination, e.g. base station or access point). Service costs are a function of the amount of data to be communicated. The larger the data size, the bigger the service cost. Service costs are not incurred when the initiating device communicates directly with the backbone and does not use the multi-hop backhaul. Intermediate backhaul nodes that participate in a multi-hop backhaul do not pay a backhaul service costs. The service costs are used to distribute service benefit to intermediate backhaul nodes. This may be realised if a) the initiating backhaul node pays $C_{BH,S}^{n_0,n_{BB}}$ to a centralised/backbone credit server, and b) the credit server distributes the service benefit following the end of a successful backhaul communication. Alternatively, this cost may be paid to the destination node (e.g. backbone) via the multi-hop backhaul route. While the credit system introduced in the present disclosure ensures that a selfish node is honest (as malevolent behaviour will decrease the payoff of the selfish node), there is a case of communication failure (e.g. due to technical problems). Should this occur, the initiating device will not pay any backhaul service cost.

Technical Compensation Service Costs $C_{T,S}^{n_x,n_y}$ are a second type of virtual cost, which a node $n_x$ pays to or credits another node $n_y$ when $n_x$ requests and eventually downloads data from $n_y$. The technical compensation service costs are paid by any node that requests data to be downloaded from another node, regardless of whether or not that other node is a peer backhaul node or the backbone or backbone gateway node. Two types of technical service compensation costs, Backhaul Technical Compensation Service Cost and Backbone Technical Compensation Service Cost are distinguished. Backhaul Technical Compensation Service Cost $C_{BH,T,S}^{n_x,n_y}$ are the costs node $n_x$ pays node $n_y$ for downloading data from $n_y$. Backbone Technical Compensation Service Cost $C_{BB,T,S}^{n_x,n_{BB}}$ are the costs node $n_x$ pays backbone for downloading data from the backbone.

The technical compensation service cost is a function of the technical cost of downloading and in one embodiment:

i. $C_{BH,T,S}^{n_x,n_y} = C_{BH,T}^{n_y,n_x}$.

ii. $C_{BB,T,S}^{n_x,n_{BB}} = C_{BB,T}^{n_{BB},n_x}$

Introduction the technical compensation service cost allows to unify the incentives for nodes to participate in upload and download scenarios in the backbone and backhaul setting.

The Service benefit $B_{BH,S}$ is a virtual benefit (credit) which is shared among the backhaul nodes that have contributed in successful backhaul communications (upload, download, or cache). In one embodiment $B_{BH,S} = C_{BH,T,S}^{n_0,n_{BB}}$. The Service benefit will only be provided when it is confirmed that the request of the node that initiates the backhaul communication request (and pays the service cost), has been served. The benefit obtained for contributing into an upload/download or cache request is shared equally amongst all backhaul nodes that participate regardless of the level of participation (or the QoS) of each backhaul node.

Based on these rules of system, the equations that govern the setup and operation of backhaul communications can now be written as follows:

Case A: Upload

Figure 4:
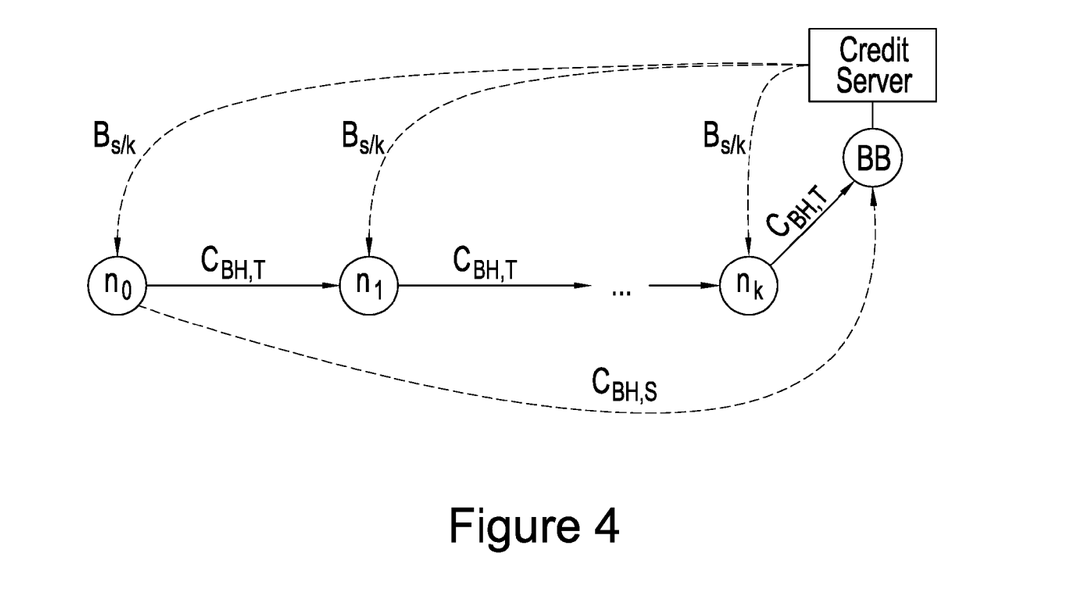
FIG. 4 shows an upload example.

FIG. 4 shows an example in which the initial node 110 and the first intermediate node 110 upload data to the next node 110 and, eventually, the kth intermediate node 110 uploads data to the backbone.

If the initiating node 110, $n_0$, transmits directly to the backbone, the total payoff (which, in this case is the backbone technical cost of uploading) is:

$$P_{n_0}^{BB} = -C_{BB,T}^{n_0,n_{BB}} \tag{1}$$

For the backhaul avenue the total payoff is:

$$P_{n_0}^{BH} = \frac{B_{BH,S}}{k} - C_{BH,T}^{n_0,n_1} - C_{BH,S}^{n_0,n_{BB}} \quad (2)$$

where, k is the number of nodes that are estimated to participate in the backhaul. As is clear from equation (2), the backhaul service cost $B_{BH,S}$ is not only credited from the initiating node to all other nodes. Instead, in the embodiment, the backhaul service cost $B_{BH,S}$ is distributed to all k nodes involved in the upload. In the embodiment the k nodes include the initiating node. It will, however, be appreciated that the inclusion of the initiating node is not essential and that, in another embodiment, the initiating node may be excluded from this calculation. The payoff/costs to the initiating node $n_0$ is also diminished by the technical costs $C_{BH,T}^{n_0,n_1}$ associated with uploading data to the next node $n_1$ and by the above mentioned backhaul service costs $C_{BH,S}^{n_0,n_{BB}}$.

A simple, and conservative way to calculate k is to use the maximum number of nodes 110 that may participate in the communications, as provided by either the {NIS$_Y$} set or, more specifically, by the Path Length Estimator 160 of the router shown in FIG. 3. The maximum length choice is conservative, because as the initial request propagates in the backhaul, an intermediate node 110 may calculate that it is more beneficial to stop using the backhaul, and thus receive a larger portion of the service benefit share.

The initiating node $n_0$ compares $P_{n_0}^{BB}$ with $P_{n_0}^{BH}$ and choose the most beneficial communication avenue (backbone or backhaul), that is the route that provides the better payback.

If the backhaul is chosen over the backbone at this first stage, then the node $n_0$ proceeds to determine whether or not the likely actions of the nodes further down the line on the backhaul affect the likely payback achievable in a manner to make it more economical or preferable in any different way to use the backbone directly after all.

The first intermediate node $n_1$ downstream of $n_0$ is known by $n_0$ to calculate:

$$P_{n_1}^{BB} = \frac{B_{S,BH}}{2} - C_{BB,T}^{n_1,n_{BB}} \quad (3)$$

$$P_{n_1}^{BH} = \frac{B_{BH,S}}{k} - C_{BH,T}^{n_1,n_2} \quad (4)$$

Equation (3) relates to the scenario in which node $n_1$ takes the data it has received from node $n_0$ via the backhaul and transmits it on to the backbone. The benefit achieved by node $n_1$ in this scenario is half of the backhaul service cost $B_{BH,S}$ (as it shares this cost with node $n_0$) but reduced by the technical costs $C_{BB,T}^{n_1,n_{BB}}$ associated with transmitting to the backbone.

Equation (4) relates to the scenario in which node $n_1$ takes the data it has received from node $n_0$ via the backhaul and transmits it on to the next node, $n_2$, on the backhaul. The benefit achieved by node $n_1$ in this scenario is a fraction k of the service cost $B_{BH,S}$ (as it shares this cost with node $n_0$ as well as all other nodes along the backhaul) but reduced by the technical costs $C_{BH,T}^{n_1,n_2}$ associated with transmitting to the backbone.

On this basis node $n_0$ estimates the benefits and costs that first intermediate node $n_1$ will calculate for different routes, i.e. $P_{n_1}^{BB}$ with $P_{n_1}^{BH}$ in order for $n_1$ to choose the most beneficial communication avenue (backbone or backhaul).

More generally, if the request reaches an $m^{th}$ intermediate node $n_m$, then all preceding nodes $n_0$ to $n_{m-1}$ may pre-estimate the possible payoffs for node $n_m$ and the subsequent choice $n_m$ will make between the backbone and backhaul avenue by comparing the following payoffs.

$$P_{n_m}^{BB} = \frac{B_{BH,S}}{m+1} - C_{BB,T}^{n_m,n_{BB}} \quad (5)$$

$$P_{n_m}^{BH} = \frac{B_{BH,S}}{k} - C_{BH,T}^{n_m,n_{m+1}} \quad (6)$$

It becomes clear that the ability of any preceding node to pre-estimate the payoffs of subsequent nodes, allows the first node to validate and correct the initial conservative estimation of the route length and the quality of service.

Case B: Download

Figure 5:
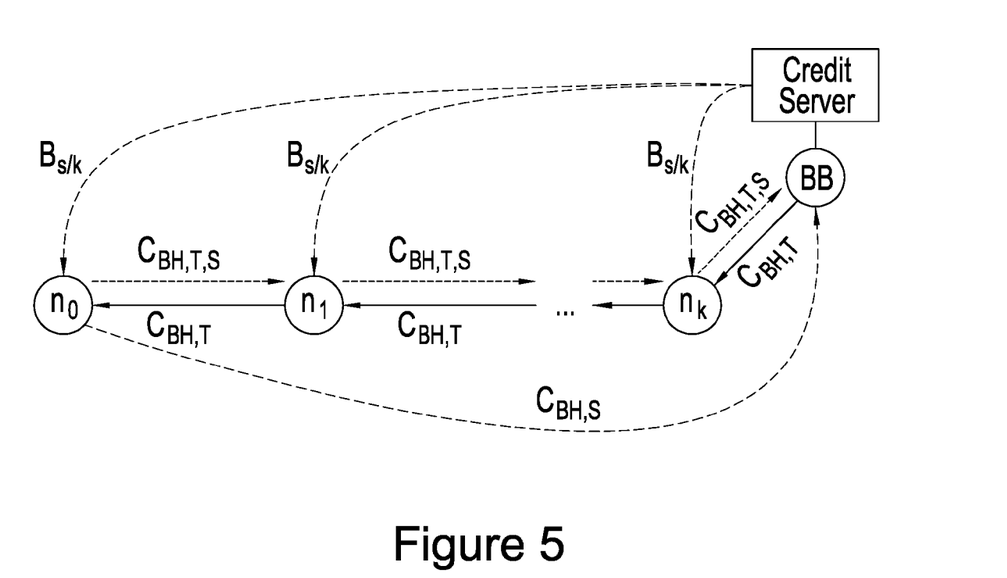
FIG. 5 shows a download example.

FIG. 5 is an example of the download case in which the initial node and the intermediate nodes download data from the next Backhaul after the last intermediate node downloads data from the backbone.

If the initiating node, $n_0$, uses the backbone avenue, the total payoff (which, in this case is the backbone technical compensation service cost) is:

$$P_{n_0}^{BB} = -C_{BB,T,S}^{n_0,n_{BB}} \quad (7)$$

For the backhaul avenue the total payoff is:

$$P_{n_0}^{BH} = \frac{B_{BH,S}}{k} - C_{BH,T,S}^{n_0,n_1} - C_{BH,S}^{n_0,n_{BB}} \quad (8)$$

It will be appreciated that for $C_{BB,T,S}^{n_x,n_{BB}} = C_{BB,T}^{n_{BB},n_x}$ and for $C_{BH,T,S}^{n_x,n_y} = C_{BH,T}^{n_y,n_x}$ equations (1) and (7) and (2) and (8) respectively are identical. This means that the incentives provided for nodes to facilitate an upload request are the same as those provided to nodes to facilitate a download request.

By comparing $P_{n_0}^{BB}$ with $P_{n_0}^{BH}$ the initiating node chooses the most beneficial communication avenue (backbone or backhaul).

If the backhaul is chosen then the first intermediate node calculates:

$$P_{n_1}^{BB} = \frac{B_{S,BH}}{2} - C_{BB,T,S}^{n_1,n_{BB}} - C_{BH,T}^{n_1,n_0} + C_{BH,T,S}^{n_0,n_1} = \frac{B_{S,BH}}{2} - C_{BB,T,S}^{n_1,n_{BB}} \quad (9)$$

$$P_{n_1}^{BH} = \frac{B_{BH,S}}{k} - C_{BH,T,S}^{n_1,n_2} - C_{BH,T}^{n_1,n_0} + C_{BH,T,S}^{n_0,n_1} = \frac{B_{BH,S}}{k} - C_{BH,T,S}^{n_1,n_2} \quad (10)$$

The first term of equation (9) is the backhaul service charge paid by node $n_0$ but shared between nodes $n_0$ and $n_1$, given that equation (9) calculates the benefits achieved by node $n_1$ if node $n_1$ downloads data from the backbone. The second term of question (9) is the technical service costs node $n_1$ has to pay to the backbone to compensate it for the technical costs incurred by the backbone in sending the data to node $n_1$. The third term of question (9) is the technical costs incurred by node $n_1$ in sending the downloaded data on to node $n_0$. The fourth term of equation (9) is the backhaul technical compensation service charge that node $n_0$ pays node $n_1$ for its services.

The first term of equation (10) is the backhaul service charge paid by node $n_0$ but shared between all k nodes determined to likely be involved in the download. The second term of question (10) is the technical service costs node $n_1$ has to pay to node $n_2$ to compensate it for the technical costs incurred by node $n_2$ in sending the data to node $n_1$. The third term of question (10) is the technical costs incurred by node $n_1$ in sending the downloaded data on to node $n_0$. The fourth term of equation (10) is the backhaul technical compensation service charge that node $n_0$ pays node $n_1$ for its services.

More generally, the $m^{th}$ intermediate node $n_m$ will compute (and compare) the payoffs of the backbone and backhaul avenues as follows.

$$P_{n_m}^{BB} = \frac{B_{BH,S}}{m+1} - C_{BB,T,S}^{n_m,n_{BB}} - C_{BH,T}^{n_m,n_{m-1}} + C_{BH,T,S}^{n_{m-1},n_m} = \frac{B_{BH,S}}{m+1} - C_{BB,T,S}^{n_m,n_{BB}} \quad (11)$$

$$P_{n_m}^{BH} = \frac{B_{BH,S}}{k} - C_{BH,T,S}^{n_m,n_{m+1}} - C_{BH,T}^{n_m,n_{m-1}} + C_{BH,T,S}^{n_{m-1},n_m} = \frac{B_{BH,S}}{k} - C_{BH,T,S}^{n_m,n_{m+1}} \quad (12)$$

Considering that $C_{BB,T,S}^{n_x,n_y} = C_{BB,T}^{n_y,n_x}$ and assuming further that $C_{BB,T}^{n_x,n_y} = C_{BB,T}^{n_y,n_x}$ it becomes clear that the functions of payoff in the upload case are equal with the functions of payoff in the download case, for corresponding backhaul nodes.

Uniform Download and Upload Process for Backhaul Node

In the most general case a backhaul node that receives a download or upload request (either from itself or a peer backhaul node) will have an option to 1) serve the request via a backbone avenue, b) serve the request via a backhaul avenue, c) serve the request via its local cache, and d) ignore the request.

Figure 6:
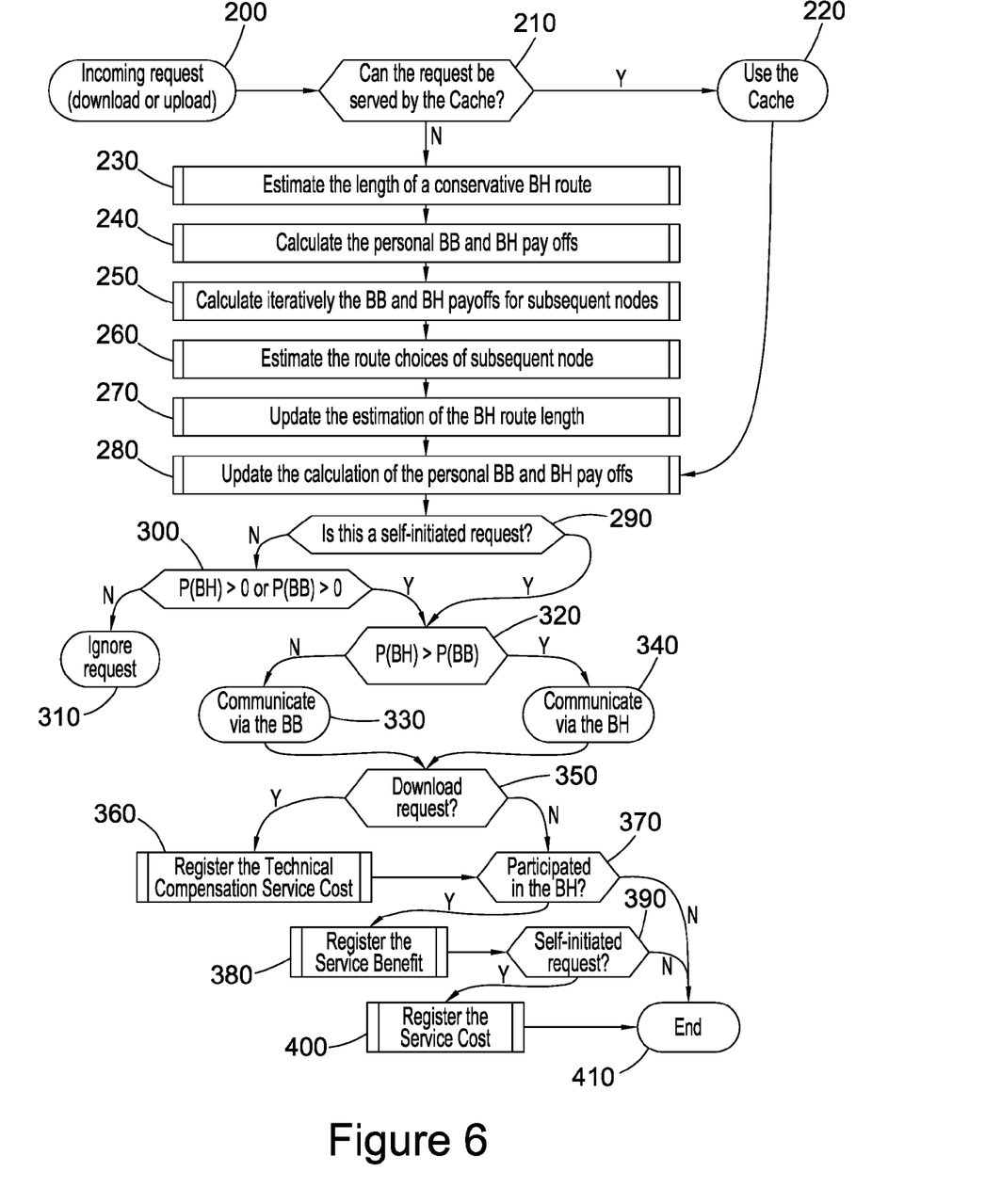
FIG. 6 show a process for servicing upload and download requests by choosing between communicating via the backbone or continue evolving the backhaul network, or using cache or ignoring a request.

Next, a more complete process of the backhaul system is given in FIG. 6 and is described. In step 200 a request for either download or upload is received. If it is determined in step 210 that the request can be served using data stored in the node's cache, then the possibility to use the cache 220 is taken into account when calculating the BB and BH payoffs to the node 110 in step 280.

If the node offers no cache service the node estimates in step 230 the length of a conservative backhaul route. For example, this could be the length of a shortest path to the destination. In step 240, based on the route length calculation, the node 110 calculates the payoffs for using the backbone or the backhaul. If the request is self-initiated, then these payoffs, P(backbone) and P(backhaul), are calculated using equations (1) and (2) in the case of upload request, and from equations (7) and (8) in the case of download request, respectively. If, otherwise, the incoming request arrives from a peer backhaul node, then the node will calculate the intermediate backbone and backhaul payoffs using equations (5) and (6) in the case of upload request and equations (11) and (12) in the case of download request, respectively. Optionally, the node 110 also calculates, iteratively in one embodiment, the backbone and backhaul payoffs for sequent nodes in step 250. This calculation is used to estimate the route lengths of subsequent nodes in step 260. Based on this estimation the estimation of the backhaul route length and the calculation of the personal backbone and backhaul payoffs is repeated and updated in step 270.

In the case where the node is an intermediate node (that is, in the case where the request is not self-initiated, as checked in step 290), the node 110 checks if at least one of P(backbone) and P(backhaul) are positive. Only in this case does the node have an incentive to participate in the backhaul. Otherwise, the node will ignore the upload/download request (step 310).

In step 320, assuming that the node 110 has determined that it should communicate the upload or download request, the node 110 decides to communicate via the backbone (as per step 330), if in step 320 it is determined that P(backbone) ≥P(backhaul), or communicate via the backhaul (as per step 340), otherwise.

Assuming a successful communication, if the request is a download request as determined in step 350, the node 100 registers the backbone or backhaul Technical Compensation Service Cost, depending on whether it has communicated via the backbone or the backhaul. This cost has two parts: one part concerns the cost the node expects to receive from the preceding node, and a second part concerns the cost the node expects to pay to the successive node of the route. In the case where the node participated in the backhaul network it will also register the Service Benefit (step 380). Further, if the node is the node that initiated the request (as determined in step 390) it will register the backhaul service cost (step 400). At some future time, following the end of the communication, the node 110 collates and aggregates its locally registered costs and benefits in order to check it out with the Credit Server.

It will be appreciated from the above that embodiments unify the incentives for downloading and uploading data within a backhaul in which free-will nodes are selfish and potentially malicious. The above discussed problem in peer-to-peer wireless networking is consequently solved.

From equations (9) to (12) above it is clear that, if a node $n_m$ was to store data that is likely to be requested for download by another node in cache, the node $n_m$ could serve the data request without further contact with the backhaul or the backbone. This means that a node servicing a download request from cache either avoids paying backbone technical compensation service costs (the second terms in equations (9) and (11) respectively) or the backhaul technical service compensation costs payable to the next node $n_{m+1}$ upstream in the backhaul (the second terms in equations (10) and (12) respectively). Additionally, in the scenario in which the cache provides data that would otherwise have been acquired from other nodes in the backhaul, a node serving a data request from cache also limits the number k of nodes involved in the backhaul download, so that the fraction of the backhaul service cost credited to the node by the initiating node is higher than it would have been, had further backhaul nodes been involved. Nodes on the backhaul are consequently incentivised by the system of the embodiment to store data likely to be requested by other nodes in the backhaul in a download scenario in any free cache storage space that may be available.

It will be appreciated that the embodiment provides incentives for peer-to-peer devices to participate in backhaul data traffic. This is also advantageous for the operators of the network as they can transmit and receive data using lower transmission energy levels than are required for data exchange with the backbone. This may in turn reduce interference problems and can, as a consequence, aid better use of available bandwidth. Nationwide or ad hoc neighbourhood operators may consequently be encouraged to develop, or at least increase the density of networks.

Example Protocol Implementation: RPL and Wireless Mesh.

In the following an embodiments concerning implementation wireless sensor networks is discussed. A classical tree topology of a mesh network supported by the RPL and Trickle protocols is considered. The basic mechanisms of these protocols are as follows.

Node discovery: a Directed Acyclic Graph (DAG) Information Object (DIO) is sent from a source (parent) node in order to discover an RPL instance.

Within the DIO each node communicates its Node Rank which is number calculated with an objective function. A simple objective function may be a function of the received SNR and/or the battery level and/or simply an incremental hop number.

In RPL, the objective function for calculating the rank is additive. That is, the rank always increases as the route length increases. In the embodiment this means that nodes close to the backbone (that is those nodes for which the technical cost for transmitting data to the backbone are relatively low) have a low rank, nodes that placed at increasing distance of the backbone, that is nodes that require the collaboration of an increasing number of other nodes to connect to the backbone indirectly/through the backhaul, have increasingly higher ranks.

The rank of neighbouring nodes allows a node to select the node with the lowest rank to be its parent node.

Each node keeps in memory a table of neighbouring nodes and their associated rank, for every RPL instance. This table is used by the node to update its routing table. An RPL instance is defined as a network that is formulated with a specific root node and a specific objective function used by child nodes. Each node may be part of different RPL instances/networks, simultaneously, if each one of them specifies a different objective function and root node.

The DIO control signal may be repeated, and the node rank and routing tables may be updated, according to the Trickle protocol, which may trigger a DIO update when a change of topology is detected.

The method of the embodiment is implemented within the RPL/Trickle framework subject to the following modifications:

Nodes are further equipped with a direct link to the destination on the backbone (root or gateway Rank 0) node.

Node Index (NI) and credit information can be included in the DIO packet.

Nodes have a virtual credit balance which is used to incentivise cooperation.

Using the above, nodes in mesh networks employing the backhaul modified RPL/Trickle framework:

Perform route discovery by analysing the NI set and obtaining $\{NI_Y\}$ (i.e. the eligible set of nodes which can serve a communication request).

Use the direct link to the gateway whenever technical costs can be traded off with a shared service benefit (credit); this is part of the updated objective function for RPL.

Update their credit balance through DIO communications with Credit Server.

Therefore, the modified protocol enables the network to operate as a mesh when short-range links are reliable (i.e. not too many hops are needed), and as a star network (i.e. direct links to the root gateway) when multi-hop routes lead to diminishing returns in terms of credit and energy expenditures.

In one embodiment the route length required for calculating shared service benefit is obtained by including an increasing hop number in the DIO (as Rank information).

Example Protocol Implementation: MANETs.

This embodiment considers the implementation of the above within mobile ad hoc networks that may be based on IEEE 802.11, such as WiFi direct, or alternative technologies such as LTE direct. The embodiment is applicable by modifications to MANET routing protocols (e.g. AODV or DRS) similar to the ones described for the RPL case study above.

Example Protocol Implementation: Delay Tolerant Networks (DTN).

In this embodiment implementation within delay and disruptive tolerant networks is considered. This involves ad hoc networks that are characterised by their lack of connectivity. In these challenging environments, classical ad hoc routing protocols such as AODV and DSR fail to establish routes. Instead, routing protocols must take to a "store and forward" approach, where data is moved and stored from hop to hop before it will eventually reach its destination.

One example of DTN may be used in Smart cities in which streets, parks and buildings being populated with sensors or so-called smart street furniture. For example New York's payphones are to be turned into Wi-Fi kiosks which people can connect to get the latest local info about their city (parking, traffic, pollution, etc). New York plans to install 10,000 of such kiosks (see http://www.mobility-trends.com/index.php/2014/11/new-yorks-payphones-to-be-turned-into-wi-fi-kiosks). Garbage bins in Finland will be installed with small waterproof sensors which measure how full the bins are, and where they are located so that collection trucks can plan their journeys more efficiently (see http://www.e-nevo.com).

In such example applications, information is not urgent (or critical), yet it is being routed straight into the core network (e.g. with the Wi-Fi kiosks acting as gateways connected to New York's wired underground infrastructure, and with Finish bin IPv6-enabled sensors connecting directly with cellular base stations. A flat rate data-contract with a local operator is included in the price of these sensors, sufficient to transmit the necessary data and publish it on a secure website.

In the following an adaptation of the backhaul algorithm to such an example is described.

In the embodiment the sensors have, in addition to their cellular communication link, also a short range low power communication capability e.g. 6LoWPAN. With 6LoWPAN, they can then use a network discovery protocol (e.g RPL/Trickle) and update and maintain their backhaul Index Table, as previously discussed. Each time a backhaul sensor wants to publish (upload) its current state it calculates the following. In this situation, the technical and service costs as well as the service benefit are as follows:

Technical Costs:

backbone: Cellular transmit power+data traffic credit cost=$C_{BB,T}^{n_0,n_{BB}}$ backhaul: 6LoWPAN transmission power=$C_{BH,T}^{n_0,n_1}$ Service Cost:

backbone: none backhaul: incentive for other backhaul sensors to cooperate e.g. the data traffic cost=$C_{BH,S}^{n_0,n_{BB}}$ Service Benefit:

backbone: none backhaul:

a fraction of the data traffic credit is gained by each cooperating bin = $\frac{B_{BH,S}}{k}$ Routes are formed dynamically and reconfigure themselves with objective to save on transmission energy and data traffic credit.

Simulation Example 1: Upload

Consider a network of N=200 identical sensor nodes residing in some 10×10 square deployment region. In this example distance units are kept arbitrary without loss of generality. For simplicity, we assume that nodes can connect (i.e. can successfully communicate and support a satisfactory data rate) if their mutual distance is less than 1. A network topology of this nature is shown in Figure Now, suppose that a source node physically located at the bottom left corner of the region requires a service from the backbone in the form of uploading a picture or Electrocardiogram (ECG) data packets to a website, and that the backbone gateway (the destination node) is located at the top right corner. The source node updates its index table and can therefore run an algorithm which calculates for example the shortest path (in terms of hops) to the backbone gateway. Other routing algorithms can of course be supported. An example realization is shown below in FIG. 7, with the shortest path (shown in red) involving k=22 hops. Let us denote the nodes on this path incrementally as $\{n_0, n_1, n_2, \ldots, n_k\}$, with $n_0$ being the source node and $n_k$ the destination node.

Figure 7:
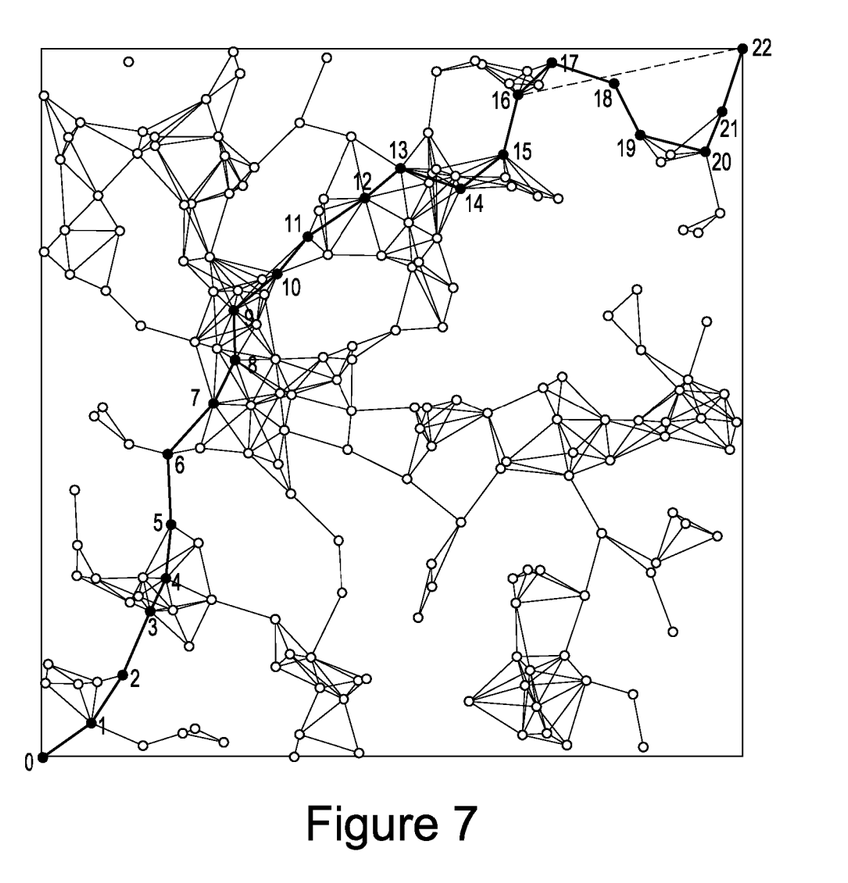
FIG. 7 shows a network topology of N=200 nodes in a square deployment region and shortest path from source (bottom left) to destination (top right). A direct link from node M=16 to k=22 is also shown by the dashed line.

In this example all nodes on this path have the capability (through for example some dedicated channel e.g. TV white space capability, wired communication etc.) to communicate directly with the backbone gateway $n_k$. However this route comes with a higher technical cost as compared with transmitting to the next backhaul device. We concretise all the above as follows.

At the beginning, node $n_0$ calculates the technical cost of uploading its packets directly to the backbone gateway $n_k$ denoted by $C_{BB,T}^{n_0,n_k}$. For example, this cost can be measured as the required transmit power necessary to achieve a given rate with a certain probability. This has empirically been shown to grow with the distance between transmitter and receiver raised to the power of the inherent path loss exponent. This technical cost can also include other factors such as processing costs, current battery life, certainty in successful transmission, etc. Also, this cost function may be different from device to device. For simplicity, in this example we take the cost function to be the cube of the transmission distance. Therefore the direct transmit cost of $n_0$ to $n_k$ is $C_{BB,T}^{n_0,n_k}=(\sqrt{2}\times 10)^3$ units (transmit cost units are kept arbitrary without loss of generality). Therefore, the initiating node can calculate that the backbone avenue for serving its upload request will cost a total of:

$$P_{n_0}^{BB} = -C_{BB,T}^{n_0,n_k}$$

For the backhaul avenue, the transmit cost of $n_0$ to $n_1$ is also calculated and denoted using a similar but not necessarily the same cost function. In this example we use the same function as for the backbone avenue (i.e. the cube of the distance) and hence $C_{BH,T}^{n_0,n_1} \leq 1$ since a connection is not possible if the distance is more than 1 distance unit. The service benefit $B_{BH,S}$ for taking the backhaul avenue is set by the Index Server and will be shared amongst at most k participants (i.e. from the point of view of $n_0$, in the worst case collaboration scenario, the service benefit will be shared among all cooperating nodes $\{n_0, n_1, n_2, \ldots, n_{k-1}\}$). The service benefit should in principle be proportional to $C_{BB,T}^{n_0, n_k}$ but can be more or less if the Index Server wants to promote or deter the backhaul avenue respectively. In this example, we simply take $B_{BH,S}=C_{BB,T}^{n_0, n_k}$ indicating that the greater the distance between source and destination, the greater the cooperation incentive should be since more nodes will need to participate. Finally, the backhaul service cost of uploading the file over the wireless backhaul denoted by $C_{BH,S}^{n_0, n_k}$ may be set by either the Index Server or $n_0$ and can depend on both distance and on other factors such as data content, estimated multi-hop cooperating nodes, data traffic flow, time of day etc. In this example it is simply taken to be $C_{BH,S}^{n_0, n_k}=B_{BH,S}$. Therefore, the initiating node can calculate that the backhaul avenue for serving its upload request will probably cost a total of:

$$P_{n_0}^{BH} = \frac{B_{BH,S}}{k} - C_{BH,T}^{n_0,n_1} - C_{BH,S}^{n_0,n_k}$$

Note that that the above is only an estimate as $n_0$ has assumed a conservative scenario where the service benefit is shared by k nodes. A less conservative estimate of the maximum number of backhaul participants could have been assumed, for example k−x>1. As will be shown, this would result in a speculated higher cooperation incentive and hence bias the backhaul avenue. This may not turn out however and so can be thought of as a risky option.

Therefore node $n_0$ now formulates the following inequality $$P_{n_0}^{BB} = -C_{BB,T}^{n_0,n_k} < \frac{B_{BH,S}}{k} - C_{BH,T}^{n_0,n_1} - C_{BH,S}^{n_0,n_k} = P_{n_0}^{BH}$$

which in the above example realization is obviously true. Therefore, $n_0$ forwards the data packet to $n_1$. Note that if $n_0$ was only a small number of hops from $n_k$, then the above inequality may have not necessarily been satisfied. Also, we note that additional costs and benefits can be included on either side of the inequality above but are not accounted here for simplicity.

Node $n_1$ receives the ECG data from $n_0$ and updates its index table to re-calculate a shortest path to the nearest backbone gateway, which in a dynamic environment may have changed. In this example we assume that the network is stationary. The transmit cost of $n_1$ to $n_k$ and to $n_2$ are calculated and denoted by $C_{BB,T}^{n_1, n_k}$ and $C_{BH,T}^{n_1, n_2}$ respectively. In addition, $n_1$ estimates that the service benefit $B_{BH,S}$ for taking the backhaul avenue that will be shared amongst at most k participants. Therefore node $n_1$ formulates the following inequality $$P_{n_1}^{BB} = \frac{B_{BH,S}}{2} - C_{BB,T}^{n_1,n_k} < \frac{B_{BH,S}}{k} - C_{BH,T}^{n_1,n_2} = P_{n_1}^{BH}$$

If this is true, $n_1$ forwards the data to $n_2$, otherwise directly uploads it to the backbone gateway $n_k$. Note that there is no service cost to $n_1$ since this has already been paid by the initiating node $n_0$. Also note that $n_1$ can make a less conservative estimate of the maximum number of backhaul participants k, for example k−x>2 which would result in a speculated higher cooperation incentive and hence favour the backhaul avenue. This may not turn out however and so can be thought of as a risky option.

More generally, for 0<m<k, node $n_0$, receives the data packet from $n_{m-1}$, and formulates the following inequality $$P_{n_m}^{BB} = \frac{B_{BH,S}}{m+1} - C_{BB,T}^{n_m,n_k} < \frac{B_{BH,S}}{k} - C_{BH,T}^{n_m,n_{m+1}} = P_{n_m}^{BH}$$

If this is true, $n_m$ forwards the image to $n_{m+1}$, otherwise uploads the image directly to the backbone gateway $n_k$. Notice that as m increases, the technical cost of forwarding the image to $n_{m+1}$ typically decreases due to $n_{m+1}$ being closer to $n_k$ than $n_m$. Also as m increases, the expected service benefit received decreases like ~1/m since it will be shared equally with the cooperating nodes. Therefore, every node wants the inequality to fail as soon as possible as to get a bigger cut. The inequality however will not fail until $n_m$ is close enough to $n_k$.

In the example realization presented in FIG. 7, the inequality fails at node $n_M$ where M=16 at which point $P^{BB}>P^{BH}$ and it is more profitable for node $n_M$ to use up more power and upload directly to $n_k$, in return for a service benefit shared between M+1 cooperators. The direct path from $n_M$ to $n_k$ is indicated in FIG. 7 as a dashed blue line.

Table 1 shows the calculated costs $C_{BB,T}^{n_m, n_k}$ and $C_{BH,T}^{n_m, n_{m+1}}$, the estimated payoffs $P^{BB}$ and $P^{BH}$ at each hop, and the final balance of each node.

TABLE 1

Costs, payoffs, and final balance of using the two possible avenues under the backhaul system

| Node | $C_{backbone, T}$ | $C_{backhaul, T}$ | $P^{backbone}$ | $P^{backhaul}$ | via | Balance |
|---|---|---|---|---|---|---|
| 0 | 2828.43 | 0.973 | −2828.43 | −2700.84 | backhaul | −2672.27 |
| 1 | 2278.56 | 0.185 | −864.349 | 128.38 | backhaul | 156.95 |
| 2 | 2037.1 | 0.697 | −1094.29 | 127.868 | backhaul | 156.438 |
| 3 | 1639.17 | 0.304 | −932.066 | 128.261 | backhaul | 156.831 |
| 4 | 1430.42 | 0.383 | −864.739 | 128.182 | backhaul | 156.752 |
| 5 | 1189.82 | 0.457 | −718.417 | 128.108 | backhaul | 156.678 |
| 6 | 1137.29 | 0.758 | −733.229 | 127.807 | backhaul | 156.377 |
| 7 | 902.689 | 0.739 | −549.136 | 127.826 | backhaul | 156.396 |
| 8 | 673.764 | 0.919 | −359.494 | 127.646 | backhaul | 156.216 |
| 9 | 504.632 | 0.437 | −221.79 | 128.128 | backhaul | 156.698 |
| 10 | 468.807 | 0.276 | −211.678 | 128.289 | backhaul | 156.858 |
| 11 | 366.438 | 0.583 | −130.736 | 127.982 | backhaul | 156.552 |
| 12 | 313.235 | 0.812 | −95.664 | 127.753 | backhaul | 156.323 |
| 13 | 253.564 | 0.811 | −51.5333 | 127.753 | backhaul | 156.323 |
| 14 | 167.459 | 0.7 | 21.1031 | 127.865 | backhaul | 156.435 |
| 15 | 103.914 | 0.953 | 72.8625 | 127.612 | backhaul | 156.182 |
| 16 | 51.8353 | 0.887 | 114.543 | 127.677 | backhaul | 156.247 |
| 17 | 23.7871 | 0.753 | 133.348 | 127.812 | backbone | 133.348 |
| 18 | 9.76866 | 0.566 | 139.096 | 127.999 | — | 0 |
| 19 | 6.15822 | 0.161 | 135.263 | 128.404 | — | 0 |
| 20 | 6.37629 | 0.768 | 128.311 | 127.797 | — | 0 |
| 21 | 0.866223 | 0.866 | 127.699 | 127.699 | — | 0 |

Simulation Example 2: Download

Consider the same setup and network realization as in Example 1/FIG. 7, and suppose that a device physically located at the bottom left corner requires a service from the backbone in the form of downloading a (say medical) image from a website, and that the backbone gateway is located at the top right corner such that the shortest multi-hop path is given by $\{n_0, n_1, n_2, \ldots, n_k\}$, with $n_0$ being the request initiating node and $n_k$ the backbone gateway node as in Example 1.

Given that the equations calculating for the backbone and backhaul payoffs in the download case are the symmetrical with the ones in the upload case, the payoffs are exactly the same, the analysis made is Example 1 also applies in Example 2.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. A wireless device comprising a processor and a memory storing:

executable instructions; and rules defining benefits to be received by the wireless device and costs incurred by the wireless device when the wireless device participates in data transfer in a network;

the executable instructions, when executed by the processor, causing the wireless device to:

store, if the wireless device forms part of a network comprising other wireless devices and a backbone, information detailing at least one of topology of the network or status of other devices of the network;

based on the rules and the topology information, estimate at least one of costs or benefits of transmitting data to the backbone via the other wireless devices of the network;

based on the rules, estimate at least one of the costs or benefits of transmitting data directly to the backbone;

wherein one or both estimates combine an estimation of technical costs of data transmission, their compensation payments and path length dependent network benefits; and determine whether the at least one of the costs or benefits of a direct exchange with the backbone outweigh those of data exchange with the backbone via other nodes, and further comprising a cache storage, the instructions causing the processor, when executed to:

check whether or not predetermined data is stored in the cache storage upon receipt of a request from another wireless device for transmission of the predetermined data;

perform a cost/benefit analysis of transmitting the predetermined data to the other wireless device; and if the cost/benefit analysis indicates that transmission of the predetermined data is advantageous for the wireless device, read the predetermined data from the cache and transmit the read data to the other wireless device.

2. A wireless device as claimed in claim 1, further comprising estimating, based on the rules, if a next wireless device on a route to the backhaul is more likely, based on a cost/benefit analysis, to exchange data with further wireless devices in the data exchange with the backhaul or to exchange data directly with the backhaul; and based on the cost/benefit determination for the next wireless device, revise the estimate of the at least one of the costs or benefits of transmitting data to the backbone via the other wireless devices.

3. A wireless device as claimed in claim 2, further comprising repeating said estimation for the next wireless device until it is determined that the next wireless device is likely to exchange data directly with the backhaul.

4. A wireless device as claimed in claim 1, the instructions when executed further causing the wireless device to perform said estimates following receipt of a request from the another wireless device to transmit data to or from the backhaul.

5. A wireless device as claimed in claim 1, the instructions when executed further causing the wireless device to:

use a route discovery protocol to form an initial estimate of a number of wireless devices likely to be involved in data transmission to/from the backhaul; and form an initial estimate of the at least one of the costs or benefits of transmitting data via the other wireless devices in the network using a route discovered using the discovery protocol.

6. A wireless device as claimed in claim 1, wherein the topology information comprises an index table that includes details of at least one of location of the other wireless devices in the network or information of data transmission services the other wireless devices in the network are likely to participate in.

7. A wireless device as claimed claim 6, further comprising using an instance of RPL protocol to at least one of update the index table or to discover a parent wireless device or updating the index table by using data received directly from the backbone.

8. A wireless device as claimed in claim 1, the instructions when executed, further causing the wireless device to receive compensation for data communication services rendered to the other wireless devices and, if the wireless device has initiated a data exchange, pay the other wireless devices for data exchange services rendered.

9. A wireless device as claimed in claim 1, wherein the rules define said benefits and costs such that a net benefit accrued by the wireless device participating in data transmission is same irrespective if the wireless device participates in forwarding of data received from another wireless device to a named destination in an upload or in a download scenario, or a combination of both.

10. A wireless backhaul network comprising a number of wireless devices according to claim 1, a backbone and a credit server allocating earned or spent credits to the wireless devices, wherein the wireless devices and the backbone are in or can establish wireless communication channels between them to form a network.

11. A wireless backhaul network according claim 10, wherein the network is a Wireless mesh/sensor network, a Wi-Fi direct network, a LTE direct network, a delay-tolerant networks, an Internet of Things network, a machine to machine network or a 5G communications network.

12. A method of operating a wireless device comprising a processor and a memory storing executable instructions and rules defining benefits to be received by the wireless device and costs incurred by the wireless device when the wireless device participates in data transfer in a network, the method comprising:

storing, if the wireless device forms part of a network comprising other wireless devices and a backbone, information detailing topology of the network;

based on the rules and the topology information, estimate at least one of the costs or benefits of transmitting data to the backbone via the other wireless devices of the network;

based on the rules, estimate the at least one of costs or benefits of transmitting data directly to the backbone;

wherein one or both estimates combine an estimation of technical costs of data transmission, their compensation payments and path length dependent network benefits; and determine whether the at least one of the costs or benefits of a direct exchange with the backbone outweigh those of data exchange with the backbone via other nodes, and further comprising a cache storage, the method further comprising:

checking whether or not predetermined data is stored in the cache upon receipt of a request from another wireless device for transmission of the predetermined data;

performing a cost/benefit analysis of transmitting the predetermined data to the other wireless device; and if the cost/benefit analysis indicates that transmission of the predetermined data is advantageous for the wireless device, reading the predetermined data from the cache and transmitting the read data to the other wireless device.

13. A method of operating a wireless network comprising a plurality of wireless devices and a backbone, the method comprising:

one of the wireless devices initiating data upload to the backbone or a data download from the backbone;

the initiating wireless device estimating, based on rules defining benefits to be received by initiating wireless devices and costs incurred by the initiating wireless devices within the network when the wireless devices participate in data transfer in a network and on information of topology of the network formed by the wireless devices, costs of uploading or downloading the data via other wireless devices in the network;

the initiating wireless device estimating the costs of uploading or downloading the data directly to/from the backbone;

wherein one or both estimates combine an estimation of technical costs of data transmission, their compensation payments and path length dependent network benefits;

determine whether at least one of costs or benefits of a direct data exchange with the backbone outweigh those of data exchange with the backbone via other nodes; and the initiating wireless device initiating the upload or requesting the download directly from the backbone or via the other wireless devices based on the determination; and further comprising a cache storage, the method further comprising:

checking whether or not predetermined data is stored in the cache upon receipt of a request from another wireless device for transmission of the predetermined data;

performing a cost/benefit analysis of transmitting the predetermined data to the other wireless device; and if the cost/benefit analysis indicates that transmission of the predetermined data is advantageous for the wireless device, reading the predetermined data from the cache and transmitting the read data to the other wireless device.

* * * * *